(12) United States Patent
Nagatani et al.

(10) Patent No.: US 10,268,399 B2
(45) Date of Patent: Apr. 23, 2019

(54) MEMORY SYSTEM USING MESSAGE MONITORING AND FIRST AND SECOND NAMESPACES

(71) Applicant: TOSHIBA MEMORY CORPORATION, Minato-ku (JP)

(72) Inventors: Akihiro Nagatani, Yokohama (JP);
Takahiro Miomo, Yokohama (JP);
Hajime Yamazaki, Kawasaki (JP);
Shinji Yonezawa, Machida (JP);
Mitsunori Tadokoro, Fujisawa (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 66 days.

(21) Appl. No.: 15/445,147

(22) Filed: Feb. 28, 2017

(65) Prior Publication Data

US 2018/0081574 A1    Mar. 22, 2018

Related U.S. Application Data

(60) Provisional application No. 62/395,799, filed on Sep. 16, 2016.

(51) Int. Cl.
*G06F 3/06* (2006.01)
*G06F 9/54* (2006.01)
(Continued)

(52) U.S. Cl.
CPC .......... *G06F 3/0613* (2013.01); *G06F 3/0619* (2013.01); *G06F 3/0653* (2013.01);
(Continued)

(58) Field of Classification Search
CPC .... G06F 3/0619; G06F 3/0613; G06F 3/0653; G06F 3/0655; G06F 3/0679; G06F 3/068;
(Continued)

(56) References Cited

U.S. PATENT DOCUMENTS 8,973,001 B2   3/2015 Russell
9,003,071 B2   4/2015 Liu
(Continued)

FOREIGN PATENT DOCUMENTS

JP    2011-8678 A    1/2011
JP    5201415 B2     6/2013
(Continued)

*Primary Examiner* — Shane D Woolwine
(74) *Attorney, Agent, or Firm* — Oblon, McClelland, Maier & Neustadt, LLP

(57) ABSTRACT

According to one embodiment, a memory system includes a first memory including a message queue having first to $n^{th}$ addresses (n≥2, n is natural number), a first pointer showing one of the first to $n^{th}$ addresses, and a second pointer showing one of the first to $n^{th}$ addresses, a monitor unit which detects whether the first and second pointers show the first address, and a processing unit which changes an address shown by the first pointer from the first address to an $i^{th}$ address (n≥i≥2, i is natural number) when the first and second pointers show the first address. An address shown by the second pointer is incremented from the first address to a $(j+1)^{th}$ address (j≥1, j is natural number) when first to $j^{th}$ messages are queued in the first to $j^{th}$ addresses.

20 Claims, 16 Drawing Sheets

(51) Int. Cl.
*G06F 12/10* (2016.01)
*G06F 12/109* (2016.01)

(52) U.S. Cl.
CPC .......... *G06F 3/0655* (2013.01); *G06F 3/0679* (2013.01); *G06F 9/546* (2013.01); *G06F 12/109* (2013.01); *G06F 3/068* (2013.01); *G06F 12/10* (2013.01); *G06F 2212/65* (2013.01)

(58) Field of Classification Search
CPC .. G06F 12/10; G06F 12/1009; G06F 12/1045; G06F 12/109; G06F 12/1036; G06F 2212/65; G06F 9/546
USPC .......................... 711/102, 170, 173, 202, 206

See application file for complete search history.

(56) References Cited

U.S. PATENT DOCUMENTS

| | | | |
|---|---|---|---|
| 9,237,195 B2 | 1/2016 | Caradonna et al. | |
| 2002/0013853 A1* | 1/2002 | Baber | H04L 47/10 709/232 |
| 2010/0229182 A1 | 9/2010 | Ito et al. | |
| 2014/0223096 A1* | 8/2014 | Zhe Yang | G06F 12/0871 711/114 |
| 2015/0261662 A1* | 9/2015 | Loh | G06F 12/023 711/170 |
| 2015/0304423 A1 | 10/2015 | Satoyama et al. | |
| 2015/0363129 A1* | 12/2015 | Watanabe | G06F 3/0619 711/114 |
| 2017/0123696 A1* | 5/2017 | Kelner | G06F 3/0619 |

FOREIGN PATENT DOCUMENTS

JP  2015-520890 A  7/2015
WO  WO 2015/162660 A1  10/2015

\* cited by examiner

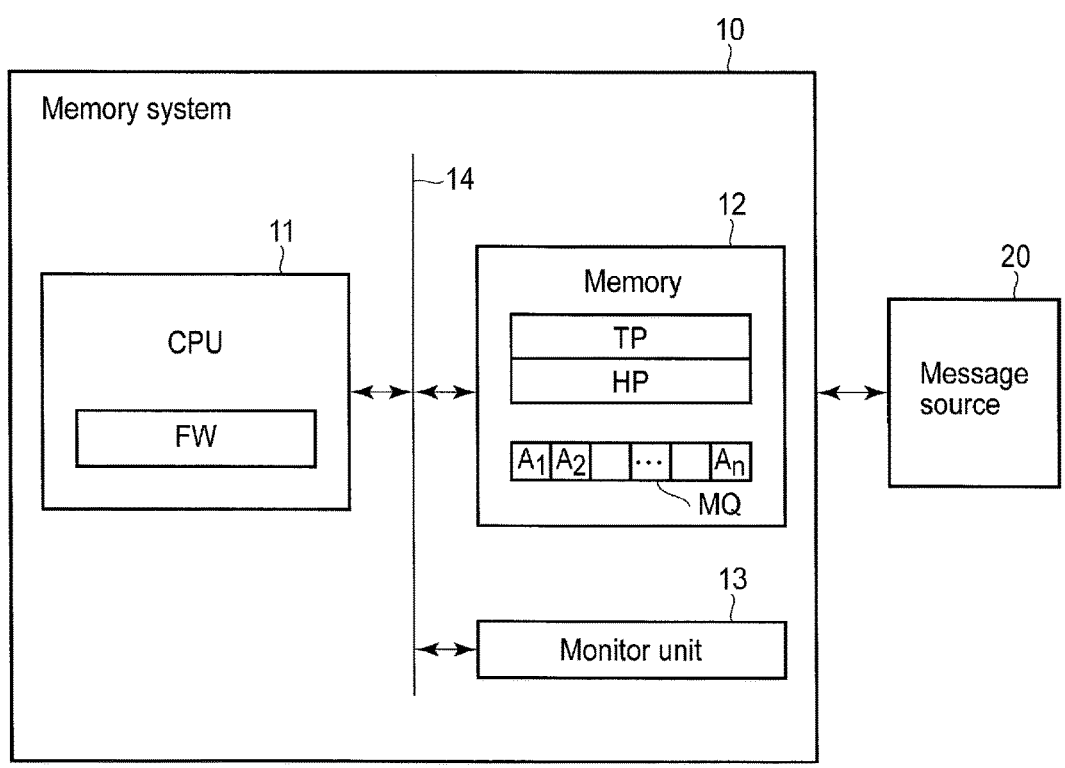
F I G. 1

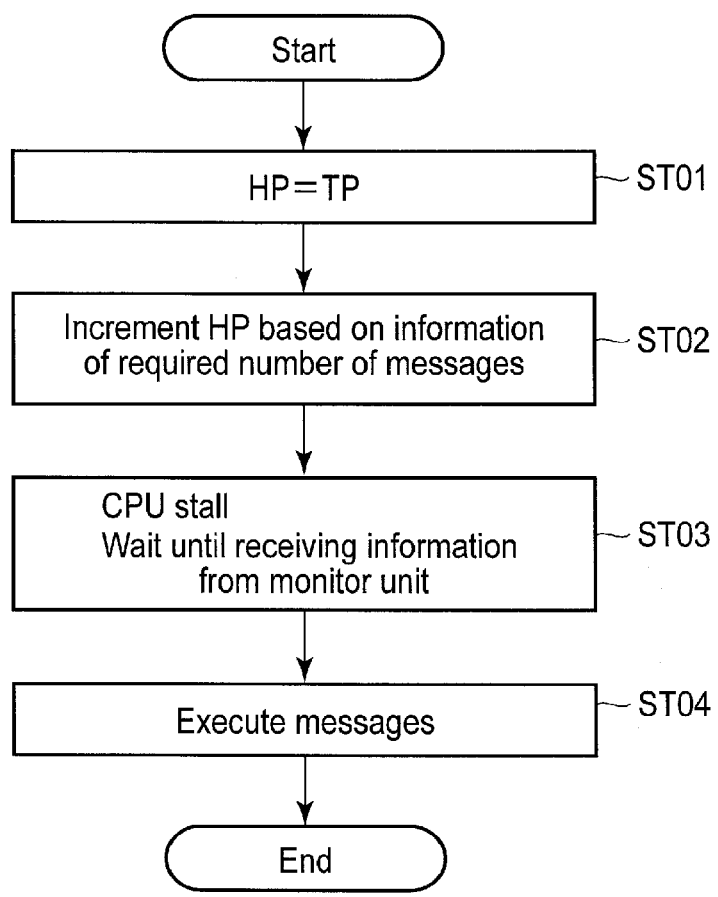
F I G. 2

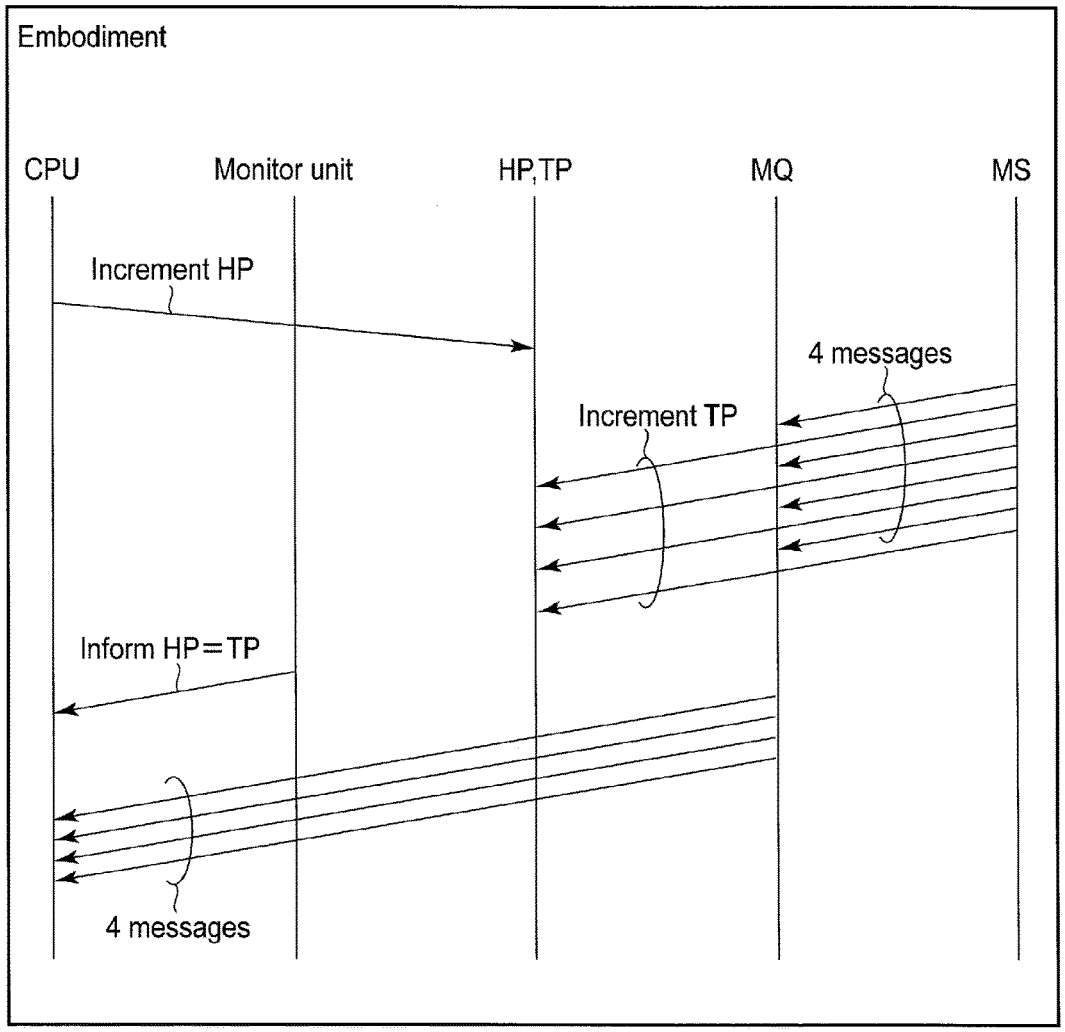
F I G. 4

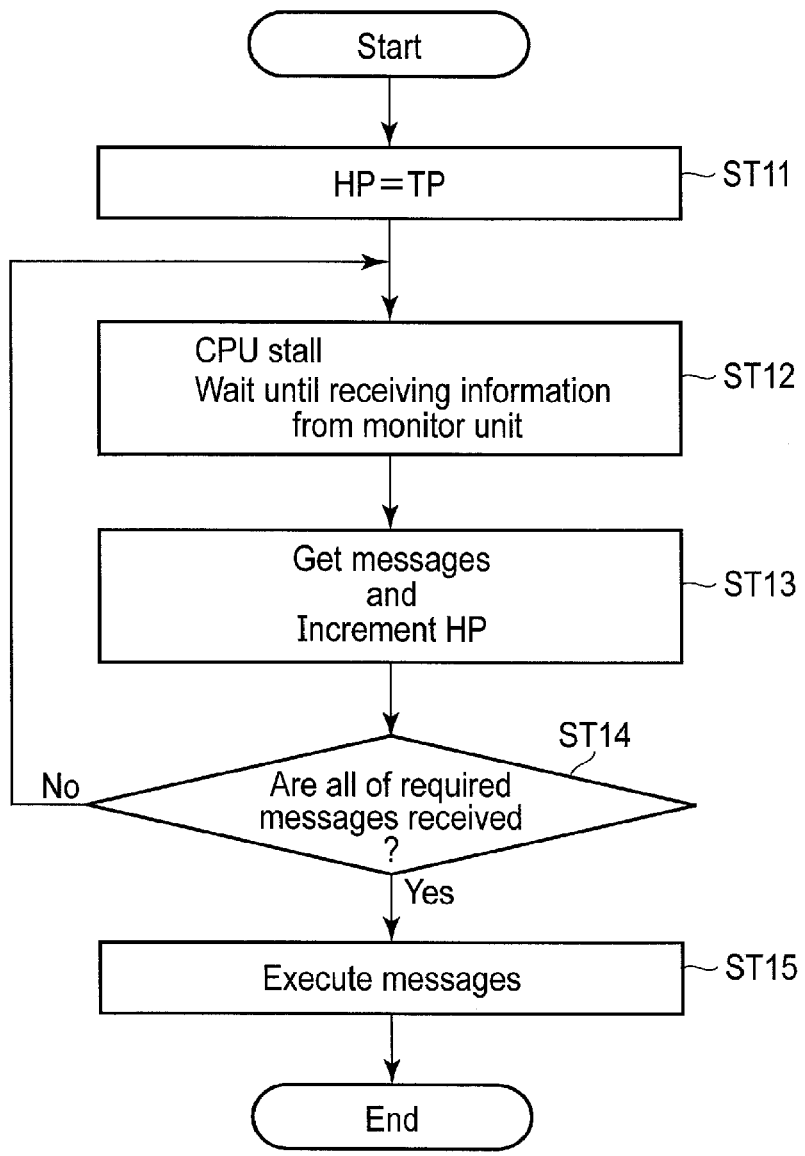
F I G. 5

Comparative example (Case of requesting multi-message)
■ Step ST11 (Initial state)
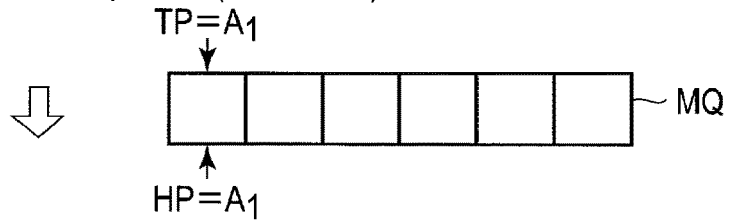
■ Receipt of message (Increment TP)
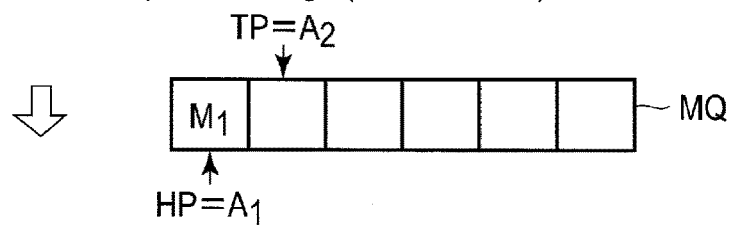
■ HP≠TP
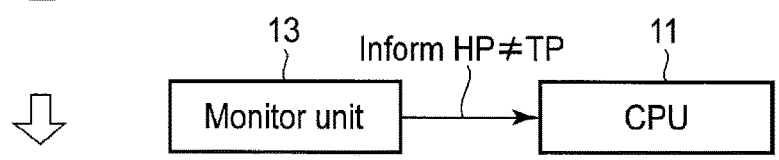
■ Step ST13
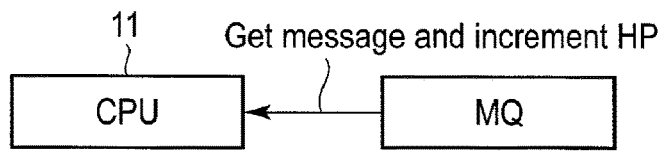
F I G. 6A

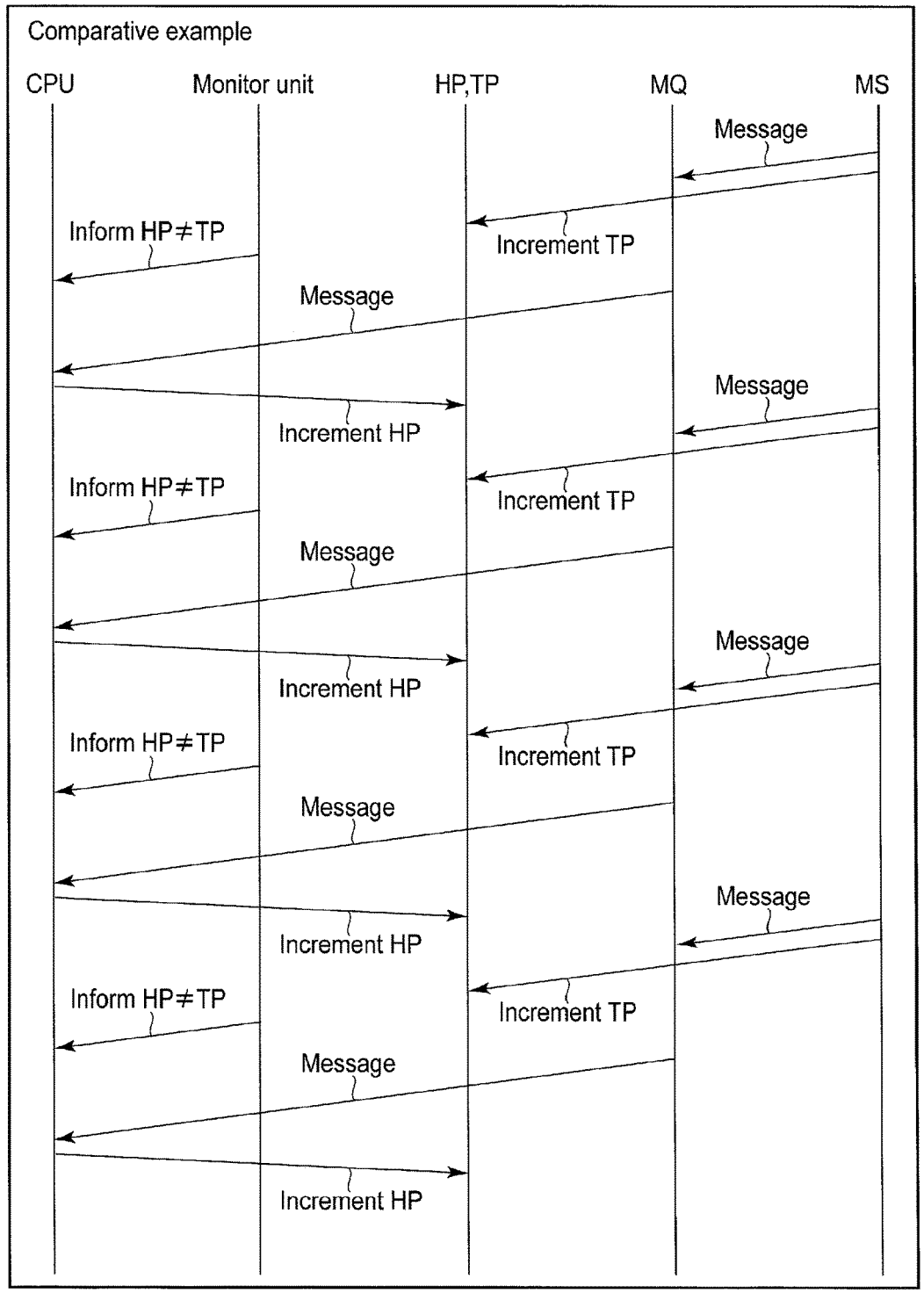
F I G. 7

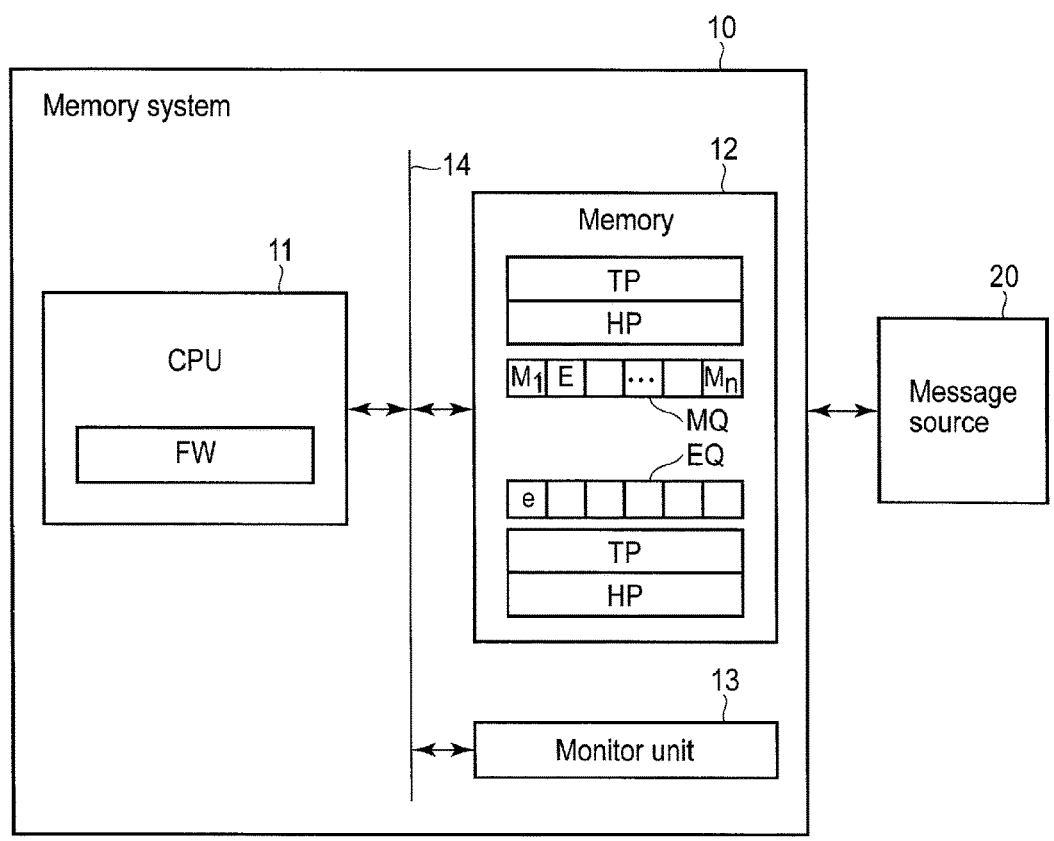
F I G. 8

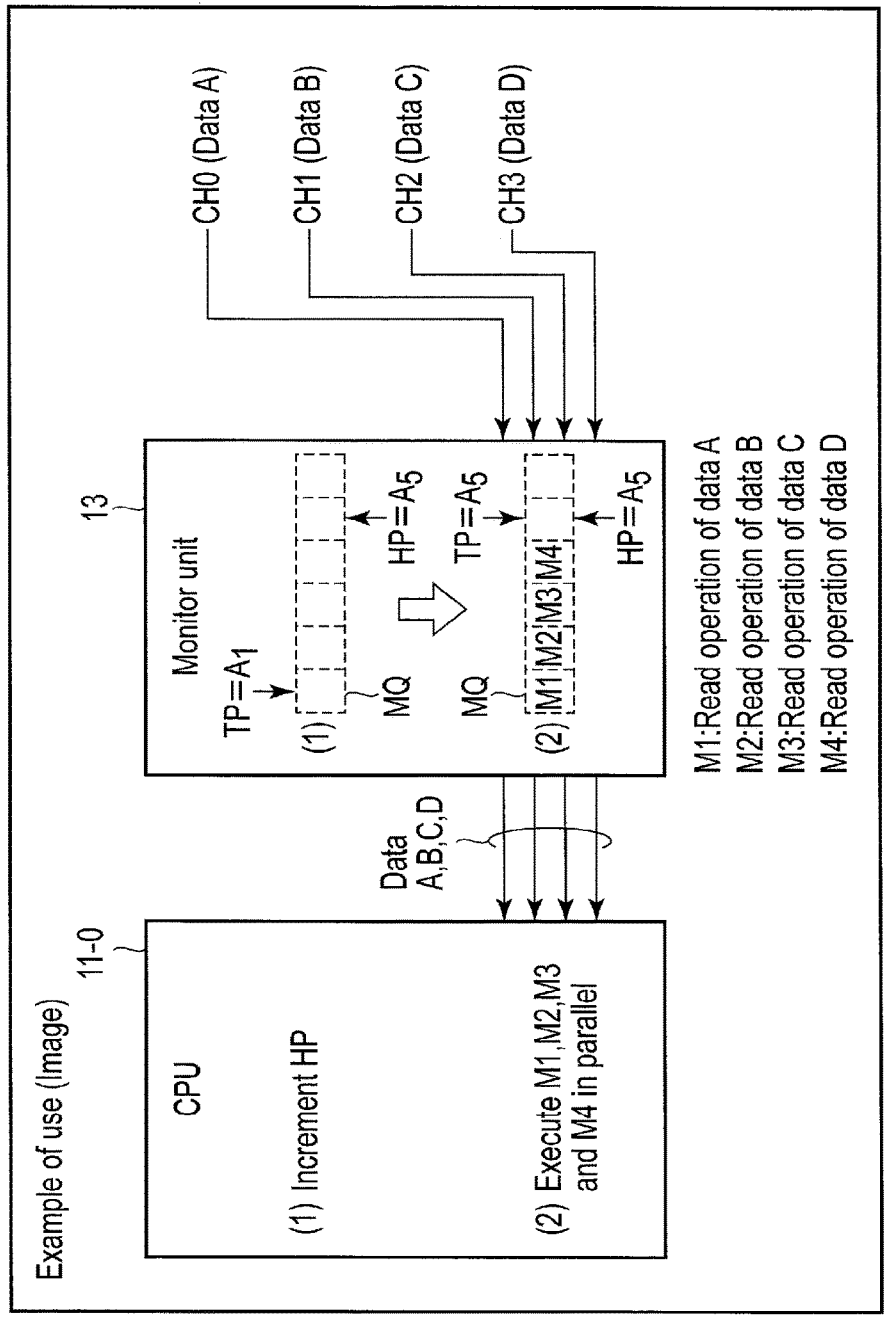
F I G. 10

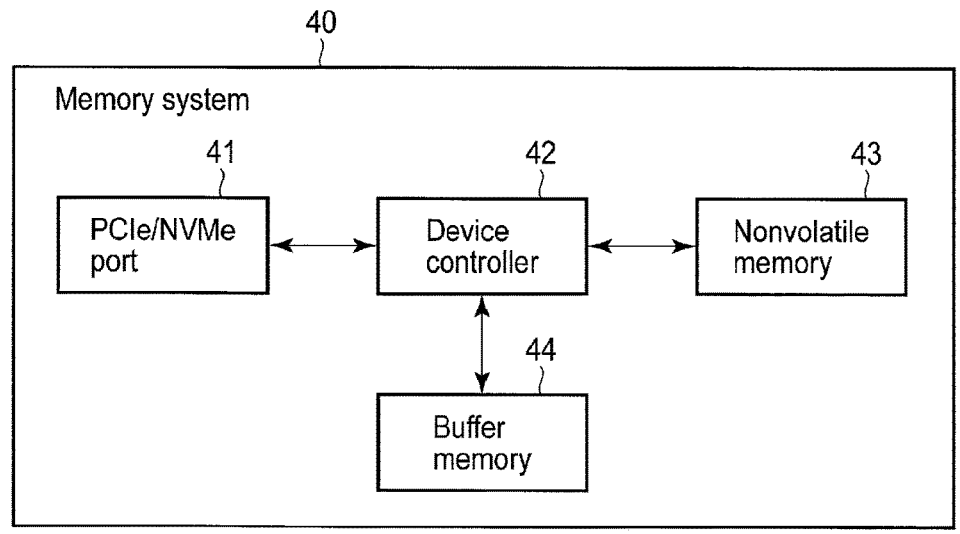
F I G. 11
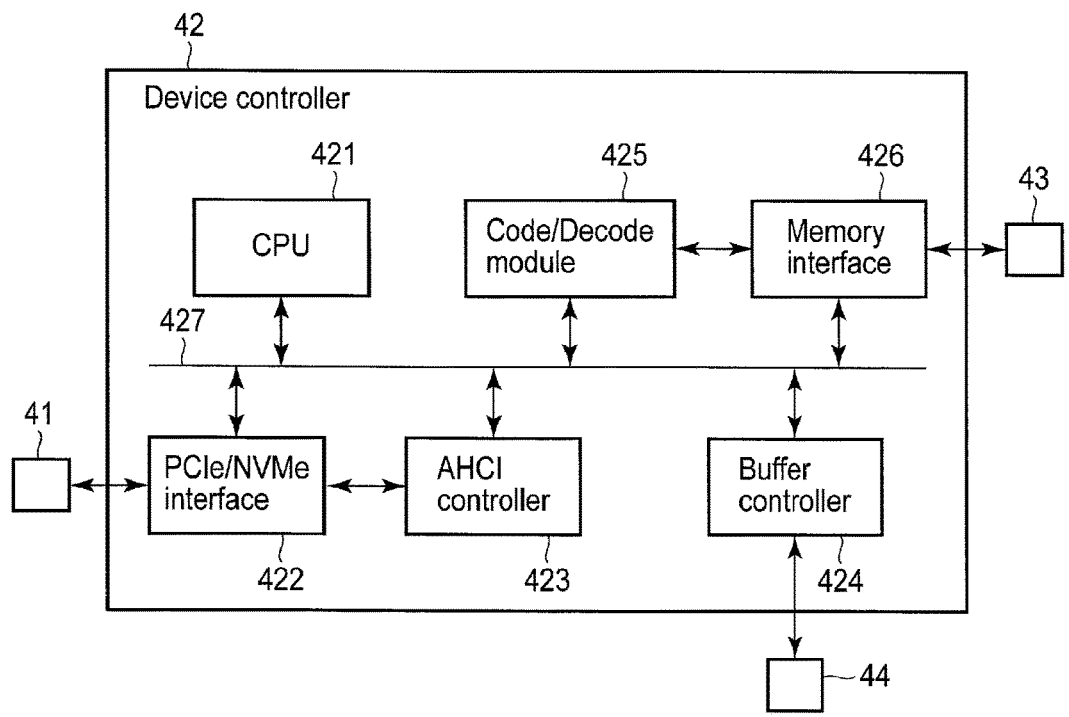
F I G. 12

| NS_ID | LBA range | Chunk No. | Capacity (GB) |
|---|---|---|---|
| 0(513GB ~ 768GB) | BAa ~ BAb | CNK_8 | 256 |
| | BAc ~ BAd | CNK_3 | 256 |
| | BAe ~ BAf | CNK_1 | 1 ~ 256 |
| 1(1GB ~ 256GB) | BAg ~ BAh | CNK_5 | 1 ~ 256 |
| 2(1GB ~ 256GB) | BAi ~ BAj | CNK_0 | 1 ~ 256 |
| ⋮ | ⋮ | ⋮ | ⋮ |
| 7(257GB ~ 512GB) | BAk ~ BAl | CNK_11 | 256 |
| | BAm ~ BAn | CNK_7 | 1 ~ 256 |

F I G. 16

| Chunk No. | LCA range (GB) |
|---|---|
| CNK_0 | CAi ~ CAj |
| CNK_1 | CAe ~ CAf |
| ⋮ | ⋮ |
| CNK_3 | CAc ~ CAd |
| ⋮ | ⋮ |
| CNK_5 | CAg ~ CAh |
| ⋮ | ⋮ |
| CNK_7 | CAm ~ CAn |
| CNK_8 | CAa ~ CAb |
| ⋮ | ⋮ |
| CNK_11 | CAk ~ CAl |
| ⋮ | ⋮ |
| CNK_15 | CAo ~ CAp |

F I G. 17

LUT size of NS_ID=0

Embodiment

| NS_ID=0 | | |
|---|---|---|
| LBA | Chunk No. | LCA |
| BAa ~ BAb | CNK_8 | CAa ~ CAb |
| BAc ~ BAd | CNK_3 | CAc ~ CAd |
| BAe ~ BAf | CNK_1 | CAe ~ CAf |

Comparative example

| NS_ID=0 | |
|---|---|
| LBA | LCA |
| BAa | CAa |
| ⋮ | ⋮ |
| BAb | CAb |
| BAc | CAc |
| ⋮ | ⋮ |
| BAd | CAd |
| BAe | CAe |
| ⋮ | ⋮ |
| BAf | CAf |

F I G. 18

MEMORY SYSTEM USING MESSAGE MONITORING AND FIRST AND SECOND NAMESPACES

CROSS-REFERENCE TO RELATED APPLICATIONS

This application claims the benefit of U.S. Provisional Application No. 62/395,799, filed Sep. 16, 2016, the entire contents of which are incorporated herein by reference.

FIELD

Embodiments described herein relate generally to a memory system.

BACKGROUND

A memory system comprising a memory capable of queuing a plurality of messages, and a processing unit which processes these messages is known.

Also, in a memory system comprising a nonvolatile memory and a controller which controls the nonvolatile memory, access to the nonvolatile memory is performed by, for example, translating logical address LBA managed by a host into logical address LCA which is the read/write unit of the nonvolatile memory.

BRIEF DESCRIPTION OF THE DRAWINGS

FIG. 1 is a diagram showing a memory system according to a first embodiment.

FIG. 2 is a flowchart showing an example of the operation of a CPU.

FIG. 4 is a diagram showing exchange of information and messages among the CPU, a monitor unit, the first and second pointers, the message queue, and a message source.

FIG. 5 is a flowchart showing a comparative example of the operation of a CPU.

FIGS. 6A and 6B are diagrams showing the relationship among a message queue, a first pointer, and a second pointer.

FIG. 7 is a diagram showing exchange of information and messages among the CPU, a monitor unit, the first and second pointers, the message queue, and a message source.

FIGS. 8 to 10 are diagrams each showing an application example of the memory system of FIG. 1.

FIG. 11 is a diagram showing a memory system according to a second embodiment.

FIG. 12 is a diagram showing an example of a device controller illustrated in FIG. 11.

FIGS. 16 and 17 are tables showing translation from logical address LBA to logical address LCA.

FIG. 18 is a diagram for comparing the second embodiment and the comparative example.

DETAILED DESCRIPTION

Figure 3:
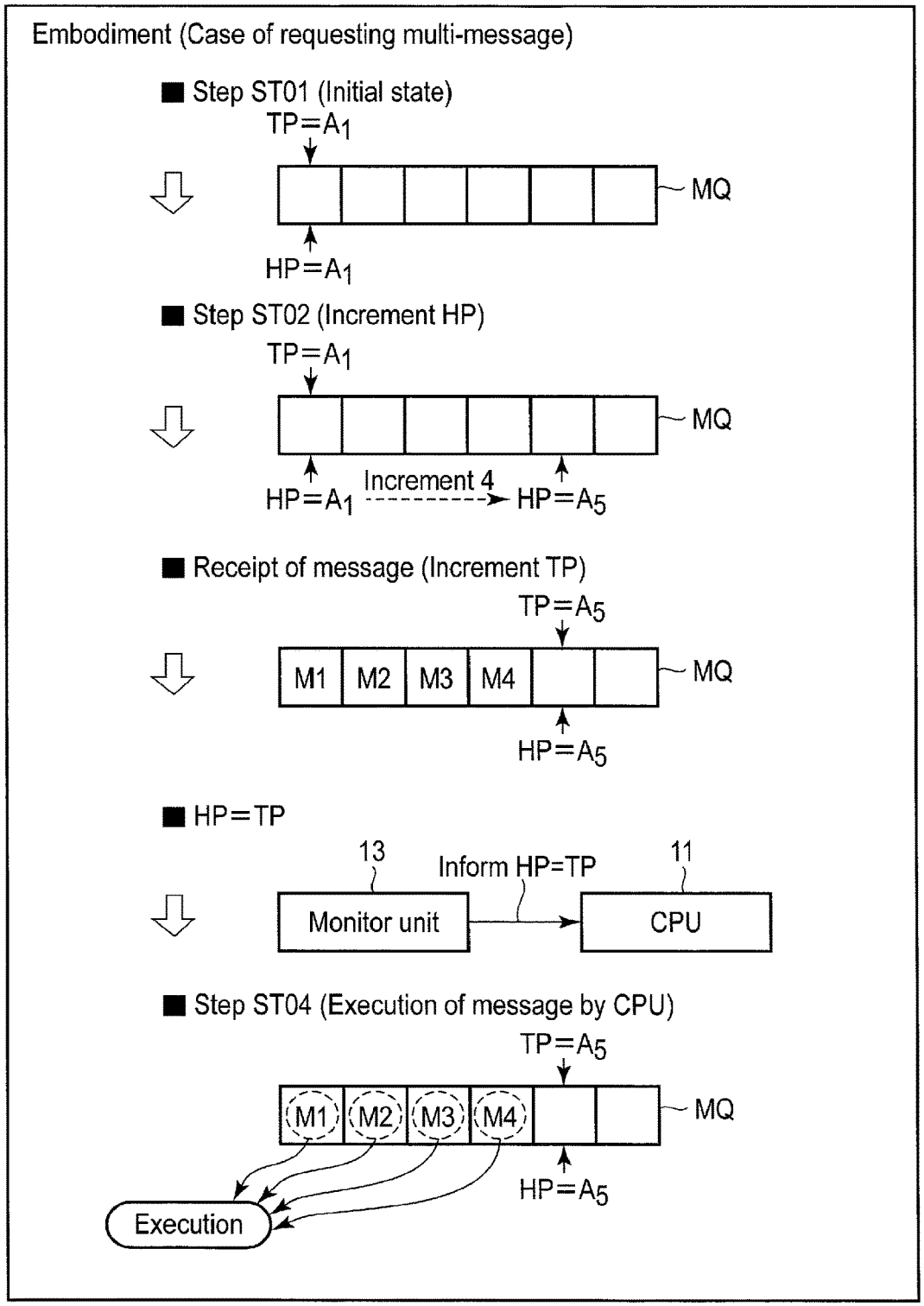
FIG. 3 is a diagram showing the relationship among a message queue, a first pointer, and a second pointer.

In general, according to one embodiment, a memory system comprises: a first memory including a message queue having first to $n^{th}$ addresses (n is a natural number greater than or equal to 2), a first pointer showing one of the first to $n^{th}$ addresses, and a second pointer showing one of the first to $n^{th}$ addresses; a monitor unit which detects whether the first and second pointers show the first address; and a processing unit which changes an address shown by the first pointer from the first address to an $i^{th}$ address (i is a natural number greater than or equal to 2 and less than or equal to n) when the first and second pointers show the first address. An address shown by the second pointer is incremented from the first address to a $(j+1)^{th}$ address (j is a natural number greater than or equal to 1) when first to $j^{th}$ messages are queued in the first to $j^{th}$ addresses, the monitor unit outputs information when (j+1) is equal to i, and the processing unit processes the first to $j^{th}$ messages on the basis of the information.

(First Embodiment)

Memory System

FIG. 1 shows a memory system according to a first embodiment.

A memory system 10 comprises a CPU 11, a memory 12, a monitor unit 13, and a bus 14 for connecting these elements.

The memory 12 is a buffer memory. The memory 12 may be a volatile RAM such as a static random access memory (SRAM) or a dynamic random access memory (DRAM), or a nonvalatile RAM such as a magnetic random access memory (MRAM), a resistance random access memory (ReRAM), or a ferroelectric random access memory (Fe-RAM).

The memory 12 includes a message queue MQ having first, second, . . . , $n^{th}$ addresses $A_1, A_2, \ldots A_n$ (where n is a natural number greater than or equal to 2), and a first pointer (a head pointer) HP and a second pointer (a tail pointer) TP holding an address of the message queue MQ. The first, second, . . . , $n^{th}$ addresses $A_1, A_2, \ldots A_n$ may be a part of all addresses in the message queue MQ. That is, the first address $A_1$ is may be an initial address in the message queue MQ or may be an address except the initial address, for example, a middle address in the message queue MQ.

The monitor unit 13 is, for example, a hardware monitor. The monitor unit 13 monitors the first and second pointers HP and TP.

From the state in which the first and second pointers HP and TP show the same address, the CPU 11 (firmware FW) increments the address shown by the first pointer HP by a predetermined number. The predetermined number corresponds to the number of messages required by the CPU 11. The number of messages required by the CPU 11 is intended as the numbers of messages that can be processed for the first time after these messages have been queued in the message queue MQ.

For example, in a case where the first and second pointers HP and TP both show the first address $A_1$, when the CPU 11 is to process k messages (where k is a natural number greater than or equal to 2), the CPU 11 changes the address shown by the first pointer HP from the first address $A_1$ to a $(k+1)^{th}$ address $A_{(K+1)}$.

Meanwhile, in each of the addresses in the message queue MQ, a message transferred from a message source 20 is queued. The message source 20 is, for example, a CPU or a hardware engine. When the message source 20 queues one message in address $A_i$ in the message queue MQ, the message source 20 increments the address shown by the second pointer TP from $A_i$ to $A_{i+i}$.

That is, when the message source 20 queues k messages in addresses from the first address $A_1$ to a $k^{th}$ address $A_k$, for example, the message source 20 changes the address shown by the second pointer TP from the first address $A_1$ to a $(k+1)^{th}$ address $A_{(k+1)}$. As a result, the addresses shown by the first and second pointers HP and TP become the same again.

When the first and second pointers HP and TP show the same address, the monitor unit 13 notifies the CPU 11 of this fact.

When the CPU 11 confirms that the first and second pointers HP and TP show the same address, the CPU 11 retrieves the k messages queued in the message queue MQ and processes these messages. Also, the CPU 11 may increment the address shown by the first pointer HP by a predetermined number (i.e., the number of messages required by the CPU 11) again, and repeat the above-described operation.

According to the aforementioned memory system, when the addresses shown by the first and second pointers HP and TP are the same, the CPU 11 increments the first pointer HP by a predetermined number corresponding to the number of necessary messages in advance. Further, every time a message from the message source 20 is queued, the message source 20 increments the address shown by the second pointer TP.

That is, the state that the addresses shown by the first and second pointers HP and TP have become the same again means that a given number of messages required by the CPU 11 are all gathered. Therefore, when the addresses shown by the first and second pointers HP and TP have become the same, the monitor unit 13 notifies the CPU 11 of this fact. Also, when a notification is received from the hardware monitor 13, the CPU can process the given number of messages.

The above means that the CPU 11 can process the given number of messages efficiently. That is, in the past, whenever a message is queued, the queue was notified to the CPU 11, and every time the CPU 11 receives the notification, the CPU 11 needed to confirm whether all of the necessary messages are gathered. For this reason, when the messages required by the CPU 11 are not completely queued, this confirmation by the CPU 11 is performed uselessly, causing degradation in the performance of the memory system. Note that this will be described later.

Therefore, according to the present embodiment, advantages such as improving the performance of the memory system by reducing the load of the CPU 11, and reducing power consumption by eliminating unnecessary operation of the CPU 11 can be obtained.

Operation

An embodiment of the operation of the memory system of FIG. 1 will be described with reference to FIGS. 2, 3, and 4.

FIG. 2 is a flowchart showing an example of the operation of the CPU (firmware). FIG. 3 is a diagram showing the relationship among the message queue MQ, the first pointer HP, and the second pointer TP. FIG. 4 shows exchange of information and messages among the CPU, the monitor unit, the first and second pointers HP and TP, the message queue MQ, and a message source MS.

In the initial state, addresses indicated by the first and second pointers are the same. In this case, it is assumed that the first and second pointers both indicate the first address $A_1$ (step ST01: HP=TP).

First, the CPU increments the address shown by the first pointer HP based on the required number of messages. In this case, since the number of messages required by the CPU is four, the CPU changes the address shown by the first pointer HP from the first address $A_1$ to a fifth address $A_5$ (step ST02).

After that, the CPU is brought into a stall state. That is, the CPU waits until information indicating that all of four messages M1, M2, M3, and M4 are gathered is received from the monitor unit (step ST03).

Meanwhile, a message is transferred from the message source MS to the message queue MQ. The message source MS increments the address shown by the second pointer TP every time the message is transferred (incrementation of TP).

Further, when all of the four messages M1, M2, M3, and M4 required by the CPU are queued in the message queue MQ, the first and second pointers HP and TP both show the fifth address $A_5$.

When the monitor unit detects that the first and second pointers HP and TP show the same address, the monitor unit informs the CPU of this fact (informs that HP=TP).

When the CPU receives a notification from the monitor unit that the first and second pointers HP and TP show the same address, the CPU stops a stall state and retrieves the four messages M1, M2, M3, and M4 from the message queue MQ and process these messages (ST04).

Note that the above operations are performed repeatedly.

FIGS. 5, 6A, 63, and 7 show a comparative example.

FIG. 5 is a flowchart showing an example of a CPU (firmware). FIG. 6 is a diagram showing the relationship among a message queue MQ, a first pointer HP, and a second pointer TP. FIG. 7 shows exchange of information and messages among the CPU, a monitor unit, the first and second pointers HP and TP, the message queue MQ, and a message source MS.

In the initial state, addresses indicated by the first and second pointers are the same. In this case, it is assumed that the first and second pointers both indicate a first address $A_1$ (step ST11: HP=TP=$A_1$, FIG. 6A).

The CPU waits until information indicating that a message is queued is received from the monitor unit (step ST12).

Meanwhile, as shown in FIGS. 6A and 7, the message source MS increments the address shown by the second pointer TP when message Mi (i=1) is transferred to the message queue MQ (incrementation of TP).

When the monitor unit detects that the first and second pointers HP and TP show different addresses, as shown in FIGS. 6A and 7, the monitor unit informs the CPU of this fact (informs that HP≠TP).

When the CPU receives a notification from the monitor unit that the first and second pointers HP and TP show different addresses, as shown in FIGS. 6A and 7, the CPU retrieves message Mi (i=1) from the message queue MQ and increments the address shown by the first pointer HP (incrementation of HP). At this time, the pointers satisfy the relationship of HP=TP again (step ST13).

Further, when the CPU determines that not all of a given number of messages that are required are gathered, the CPU suspends a process of message Mi (i=1) retrieved from the message queue MQ (step ST14).

Figure 6B:
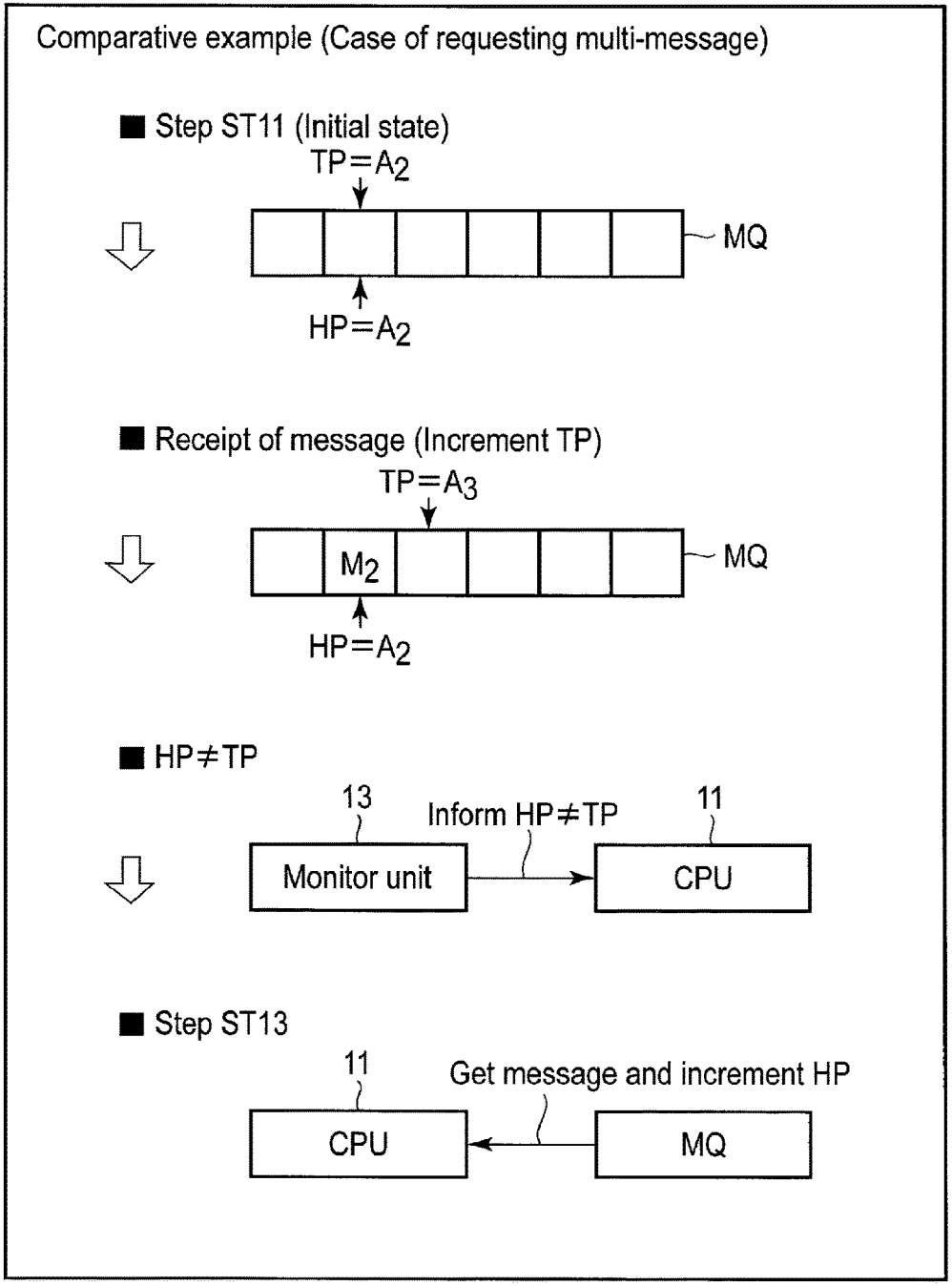

Further, as shown in FIGS. 6B and 7, the above operations are performed until all of the given number of messages that are required by the CPU are gathered. However, the initial state is set to HP=TP=$A_2$.

That is, as shown in FIGS. 6B and 7, the message source MS increments the address again shown by the second pointer TP when the next message Mi (i=2) is transferred from the message source MS to the message queue MQ (incrementation of TP).

When the monitor unit detects that the first and second pointers HP and TP show different addresses, as shown in FIGS. 6B and 7, the monitor unit informs the CPU of this fact (informs that HP≠TP).

When the CPU receives a notification from the monitor unit that the first and second pointers HP and TP show different addresses, as shown in FIGS. 6B and 7, the CPU retrieves message Mi (i=2) from the message queue MQ and increments the address shown by the first pointer HP (incrementation of HP). At this time, the pointers satisfy the relationship of HP=TP again (step ST13).

Further, when the CPU determines that not all of the given number of messages that are required are gathered, the CPU suspends a process of messages M1 and M2 retrieved from the message queue MQ (step ST14).

Further, the CPU processes the messages when all of the required four messages M1, M2, M3, and M4 are gathered (step ST15).

In the above-described comparative example, every time a message is transferred from the message source MS to the message queue MQ, the fact that HP≠OTP is notified to the CPU from the monitor unit. Accordingly, the CPU must retrieve a message every time such a notification is received, and when the given number of messages that are required are not completely gathered, a process of the messages must be suspended.

That is, since the CPU (firmware) is required to retrieve a message and determine whether to execute or suspend a message process every time the message is queued, a load of the CPU is increased and the performance of the memory system is degraded. Further, since the rate of operation of the CPU is increased, the power consumption is increased.

In contrast, the embodiment can resolve the problems as described above. That is, as has been described referring to FIGS. 2, 3, and 4, there is no need to notify the CPU from the monitor unit, or to retrieve a message or determine whether to execute or suspend the process by the CPU becomes a stall state until all of the given number of messages required by the CPU are gathered. In this way, an improvement of performance of the memory system is realized by reducing the load of the CPU, and a reduction of power consumption is realized by eliminating unnecessary operation of the CPU.

Application Example

Figure 9:
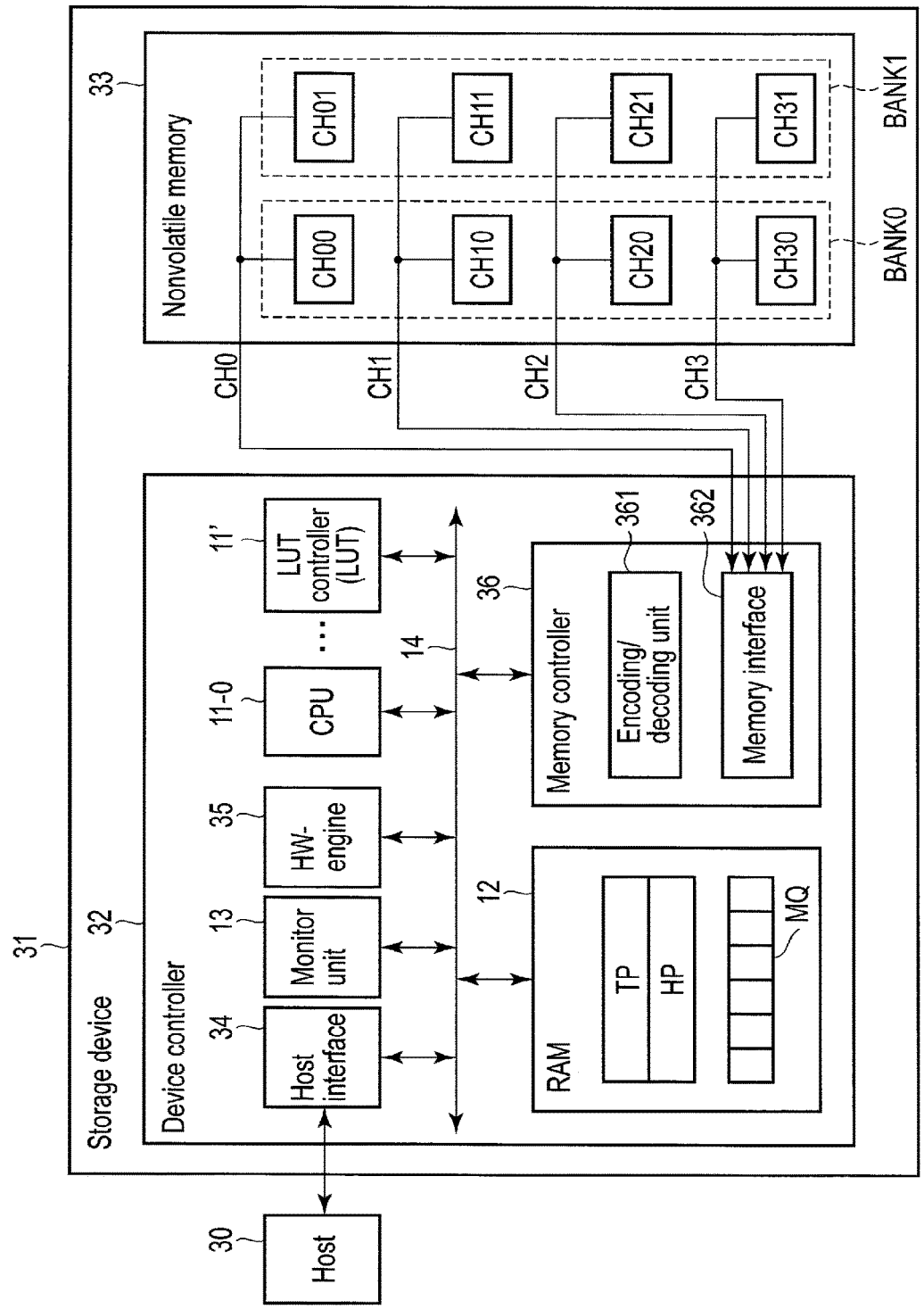

FIGS. 8 to 10 show application examples of the memory system of FIG. 1.

The example of FIG. 8 has a feature in that the memory 12 further includes an error queue EQ as compared to the memory system of FIG. 1. The error queue EQ queues information indicating whether a message queued in the message queue MQ includes an error.

For example, when messages M1, . . . , Mn are queued in the message queue MQ, and those messages include an error message E, detailed information e regarding the error message E is queued in the error queue EQ.

In the memory system of FIG. 1, when all of the given number of messages required by the CPU are gathered, a notification of this fact is given to the CPU. Accordingly, the CPU cannot confirm the detailed information e on the error message at the point when the error message E was queued in the message queue MQ. Hence, the detailed information e on the error message E is queued in the error queue EQ.

In this case, after the CPU has received a notification that the given number of messages are completely gathered from the monitor unit, the CPU retrieves these given number of messages and also retrieves the detailed information e on the error message E at the same time. The CPU can perform a predetermined error process on the basis of the detailed information e on the error message E.

Note that the monitor unit can also immediately inform the CPU of the fact that the error message E is received when the detailed information e on the error message E is queued in the error queue EQ. In this case, the CPU can confirm the error message E and the detailed information e thereon before the given number of messages are completely gathered.

That is, the CPU can perform a predetermined error process to the error message E before the given number of messages are completely gathered.

FIGS. 9 to 11 show an example in which the memory system of FIG. 1 is applied to a storage device.

A host 30 is an electronic apparatus such as a personal computer and a portable terminal. The host 30 may be an imaging device such as a digital still camera or a video camera, a tablet computer, a smartphone, a game console, a car navigation system, a printer, a scanner or a server system.

A storage device 31 is a device connectable to the host 30, and is, for example, a solid-state drive (SSD) or a USB memory. The storage device 31 may be incorporated into the host 30, or may be connected to the host 30 via a cable or a network.

The host 30 and the storage device 31 are connected to each other by a predetermined interface standard. The predetermined interface standard is, for example, a Peripheral Component Interconnect Express (PCIe) standard having the broadband, low latency, high expandability, etc., features, or a Non-Volatile Memory Express (NVMe) standard which deals with a nonvolatile memory (storage memory) on the interface of the PCIe standard.

The predetermined interface standard may be a Serial Advanced Technology Attachment (SATA) standard, a Universal Serial Bus (USB) standard, a Serial Attached SCSI (SAS) standard, a Mobile Industry Processor Interface (MIPI) standard, a Unified Protocol (UniPro) standard, etc.

The storage device 31 includes a device controller 32 and a nonvolatile memory 33. The nonvolatile memory 33 is a storage memory whose capacity can be increased, that is, a NAND flash memory, for example. The nonvolatile memory 33 may comprise a memory cell having a two-dimensional structure or may comprise a memory cell having a three-dimensional structure. The nonvolatile memory 33 may include a plurality of memory chips which are stacked.

The nonvolatile memory 33 includes a plurality of channels (in this case, four channels) CH0, CH1, CH2, and CH3, and a plurality of banks (in this case, two banks) BANK0 and BANK1).

The plurality of channels CH0, CH1, CH2, and CH3 are elements which can be operated in parallel. For example, in parallel with read/write in one channel CH0, read/write in the remaining three channels CH1, CH2, and CH3 can be executed. As can be seen, the plurality of channels CH0, CH1, CH2, and CH3 realize high-speed read/write.

The plurality of banks BANK0 and BANK1 are elements for executing an interleave operation. For example, each of the channels includes two chips. In this case, when the read/write in chips CP00, CP10, CP20, and CP30 within BANK0 is busy (i.e., execution in progress), data transfer is executed between chips CP01, CP11, CP21, and CP31 within BANK 1 and the device controller 32. In this way, the data transfer between the nonvolatile memory 33 and the device controller 32 is performed efficiently.

The device controller 32 comprises, for example, a CPU 11-0, . . . , an LUT controller 11', a RAM (memory) 12, a monitor unit 13, a host interface 34, a hardware engine 35, a memory controller 36, and a bus 14 which connects these elements. The CPU 11-0, . . . , the RAM 12, the monitor unit 13, and the bus 14 correspond to the CPU 11, the RAM 12, the monitor unit 13, and the bus 14 of the memory system of FIG. 1.

The host interface 34 receives various commands such as read/write commands from the host 30. For example, a message queued in the message queue MQ within the RAM 12 is an access command (read/write command) to the nonvolatile memory 33 which is transferred from the host 30.

In access to the nonvolatile memory 33, the LUT controller 11' refers to an LUT (an address translation table), and translates a logical address from the host 30 into a physical address of the nonvolatile memory 33.

The CPU 11-0, . . . , 11-n are assigned to perform various functions for access when, for example, the nonvolatile memory 33 is to be accessed.

The memory controller 36 comprises an encoding/decoding unit 361, and a memory interface 362. The encoding/decoding unit 361 includes, for example, an error correction code (ECC) encoder, and an ECC decoder.

When data is to be written to the nonvolatile memory 33, the encoding/decoding unit 361 adds an error correction code (ECC) to the write data as a redundant code by encoding (i.e., ECC encoding) the write data. Also, when the data is to be read from the nonvolatile memory 33, the encoding/decoding unit 361 uses the ECC added to the read data and performs error correction of the read data (ECC decoding).

The memory interface 362 serves as the interface of the nonvolatile memory 33.

In this case, although the RAM 12 is arranged within the device controller 32, the RAM 12 can be provided independently of the device controller 32 in place of the present structure.

As an example of use of the storage device described above, for example, as shown in FIG. 10, a case where the CPU 11-0 needs to simultaneously process four messages (read commands of data A, B, C, and D) by the instruction from the host 30 will be described.

In this case, the CPU 11-0 changes the address shown by the first pointer HP from the first address $A_1$ to the fifth address $A_5$, for example.

When responses to the four messages (read commands of data A, B, C, and D) M1, M2, M3, and M4 are transferred from the nonvolatile memory 33 as the message source MS to the message queue MQ, these four messages M1, M2, M3, and M4 are processed by the CPU 11-0. Further, the CPU 11-0 changes the address shown by the second pointer TP from the first address $A_1$ to the fifth address $A_5$, for example.

In this case, data A, B, C, and D, for example, are read in parallel in the CPU 11-0 from channels CH0, CH1, CH2, and CH3. Also, the CPU 11-0 is enabled to simultaneously process these items of data A, B, C, and D.

Summary

As described above, according to the first embodiment, it is possible to improve the performance of the memory system by reducing the load of the CPU, and reduce power consumption by eliminating unnecessary operation of the CPU.

(Second Embodiment)

FIG. 11 shows a memory system according to a second embodiment.

A memory system 40 comprises a PCIe/NVMe port 41, a device controller 42, a nonvolatile memory 43, and a buffer memory 44.

The nonvolatile memory 43 is a storage memory, and is a NAND flash memory, for example. The device structure of the nonvolatile memory 43 may be a two-dimensional structure or a three-dimensional structure.

The buffer memory 44 is, for example, a volatile RAM such as a DRAM or an SRAM. The buffer memory 44 may be a nonvolatile RAM such as an MRAM, an ReRAM, or an FeRAM. The buffer memory 44 is used as a cache memory, for example. Although the buffer memory 44 is arranged outside the device controller 42, the buffer memory 44 may be arranged inside the device controller 42.

The memory system 40 can be connected to a host via the PCIe/NVMe port 41. The nonvolatile memory 43 stores, for example, user data and an LUT (a look-up table) which translates logical address LBA into logical address LCA when the host is to access the user data. The LUT is also stored in the buffer memory 44 as cache data. The LUT may be stored in a memory in the host.

By referring to the LUT, the device controller 42 translates logical address LBA into logical address LCA.

The host manages a namespace. When the maximum capacity of the namespace is defined as $C_{max}$, the namespace includes LUT chunks each having a predetermined capacity of $A=C_{max}/Y$, where Y is a natural number greater than or equal to 2. Further, logical address LBA is translated into logical address LCA via the LUT chunks.

Note that the definition and the detailed explanation of each of the logical addresses LBA and LCA, the namespace, and the LUT chunk will be provided later.

The number of LUT chunks in the namespace is determined based on the capacity of the namespace provided by the host. When the maximum number of namespaces managed by the host is assumed as X, the total number N of the LUT chunks is (X+Y). Here, Y is greater than or equal to X (Y≥X). Further, Y is the maximum number of LUT chunks which can be set in one namespace. Furthermore, preferably, A×N should be greater than the capacity of the nonvolatile memory 43.

FIG. 12 shows an example of the device controller 42 illustrated in FIG. 11.

The device controller 42 comprises, for example, a CPU 421, a PCIe/NVMe interface 422, an Advanced Host Controller Interface (AHCI) controller 423, a buffer controller 424, a code/decode module 425, a memory interface 426, and a bus 427 connecting these elements.

The PCIe/NVMe interface 422 controls data communication using the PCIe/NVMe port 41 based on the PCIe/NVMe standard. The AHCI controller 423 interprets the nonvolatile memory 43 as a storage device connected to the host, and controls data communication between the host and the storage device. The buffer controller 424 serves as an interface of the buffer memory 44.

The code/decode module 425 performs coding of write data to the nonvolatile memory 43, and decoding of read data from the nonvolatile memory 43. A method of coding/decoding is not particularly limited. For example, as the method of coding/decoding, Reed Solomon (RS) coding/decoding, Bose Chaudhuri Hocquenghem (BCH) coding/decoding, Low Density Parity Check (LDPC) coding/decoding, etc., can be used.

The memory interface 426 serves as the interface of the nonvolatile memory 43. The memory interface 426 controls data communication with the nonvolatile memory 43. The CPU 421 controls a read/write operation for the nonvolatile memory 43, on the basis of an instruction from the host. Also, the CPU 421 controls the operations such as garbage collection and refresh.

Figure 13:
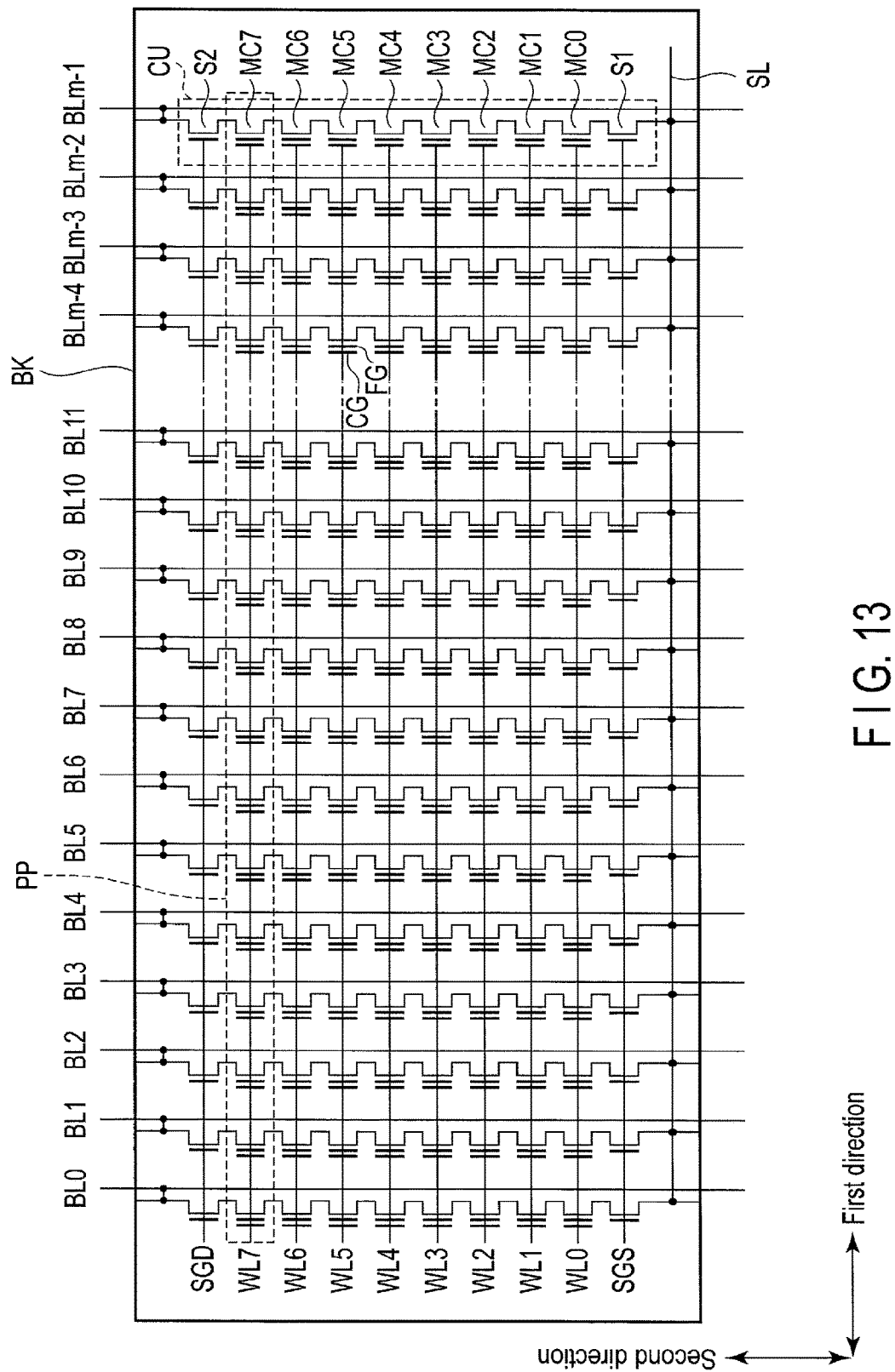
FIG. 13 is a diagram showing an example of a nonvolatile memory.

FIG. 13 shows an example of a nonvolatile memory.

The nonvolatile memory includes a block BK.

The block BK comprises a plurality of cell units CU arranged in a first direction. One cell unit CU includes a memory cell string extending in a second direction intersecting the first direction, a transistor (field effect transistor: FET) S1 which is connected to one end of a current path of the memory cell string, and a transistor (FET) S2 which is connected to the other end of the current path of the memory cell string. The memory cell string includes eight memory cells, i.e., memory cells MC0 to MC7, whose current paths are connected in series.

One memory cell MCk (k is one of 0 to 7) includes a charge storage layer (for example, a floating gate electrode) FG, and a control gate electrode CG.

In this case, one cell unit CU includes eight memory cells MC0 to MC7, but the number of memory cells is not limited to this. For example, one cell unit CU may comprise two or more memory cells, for example, 32 or 56 memory cells. Also, each of the memory cells may be a single-level cell (SLC) capable of storing 1-bit data, or a multilevel cell (MLC) capable of storing data of 2 bits or more.

A source line SL is connected to one end of the current path of the memory cell string via select transistor S1. A bit line BLm-1 is connected to the other end of the current path of the memory cell string via select transistor S2.

Word lines WL0 to WL7 are connected in common to the control gate electrodes CG of the respective memory cells MC0 to MC7 arranged in the first direction. Similarly, a select gate line SGS is connected in common to gate electrodes of the respective select transistors S1 arranged in the first direction, and a select gate line SGD is connected in common to gate electrodes of the respective select transistors S2 arranged in the first direction.

One page PP comprises m memory cells connected to a single word line WLi (i is one of 0 to 7). The read/write operation of the nonvolatile memory is performed per page PP (corresponding to a cluster), and the erase operation is performed per block BK.

The memory system 40 described above provides one or more address spaces for the host. The address space is a range of address which can be specified by the host. Address information indicating a position within the address space is represented as a logical address. When a plurality of address spaces are provided, in order to distinguish between the address spaces, names are given. The address space provided by the memory system 40 is represented as a namespace (NS).

The host specifies the position of data within the memory system 40 by using an identifier of the namespace (namespace ID: NS_ID), and a logical address. The logical address is represented by, for example, a logical block address (LBA). The logical address LBA is an address of a data unit (region) managed by the host. Accordingly, the logical address LBA is translated into a logical address (logical cluster address) LCA of the read/write unit (cluster) of the nonvolatile memory 43.

Recently, in order to meet the demands of making the capacity of the memory system 40 larger, a memory capacity of the nonvolatile memory 43 as the storage tends to be increased. In accordance with the above, for example, the size of the LUT (look-up table) which associates logical address LBA and logical address LCA with each other, that is, the memory capacity (the number of pointers) required by the LUT, is increased. Also, since the number of pointers which associate logical address LBA and logical address LCA with each other is increased, the time required for processes such as addition and deletion of the namespace is increased, and the load of the device controller 42 is increased.

Hence, in the present embodiment, the maximum capacity (Max capacity) of one namespace is divided by a given unit A. For example, when the maximum number of the namespaces which the host can set is X, the number of divisions Y of the maximum capacity of one namespace is assumed to be a number which is equal to X or greater than X. Further, management of the namespace is assumed to be carried out by a given unit A×n. Here, n is one of 1 to Y.

A memory space of the given unit A is referred to as an LUT chunk.

As can be seen, by managing the namespace by using the LUT chunks, it becomes unnecessary to associate logical address LBA and logical address LCA with each other one by one. That is, the number of pointers which associates logical address LBA and logical address LCA with each other can be reduced, and thus, processes such as addition and deletion of the namespace do not take time, and the load of the device controller 42 can be reduced. This will be described later.

Further, it is assumed that the total number N of the LUT chunks is (X+Y).

In this case, a total capacity of all of the LUT chunks becomes (X+Y)×A, and becomes greater than the maximum capacity Y×A of one namespace. The reason the total capacity of all of the LUT chunks is set greater than the maximum capacity of one namespace is that it is assumed a case where not all of capacity A of one LUT chunk is used.

Hereinafter, a specific example will be described.

Figure 14:
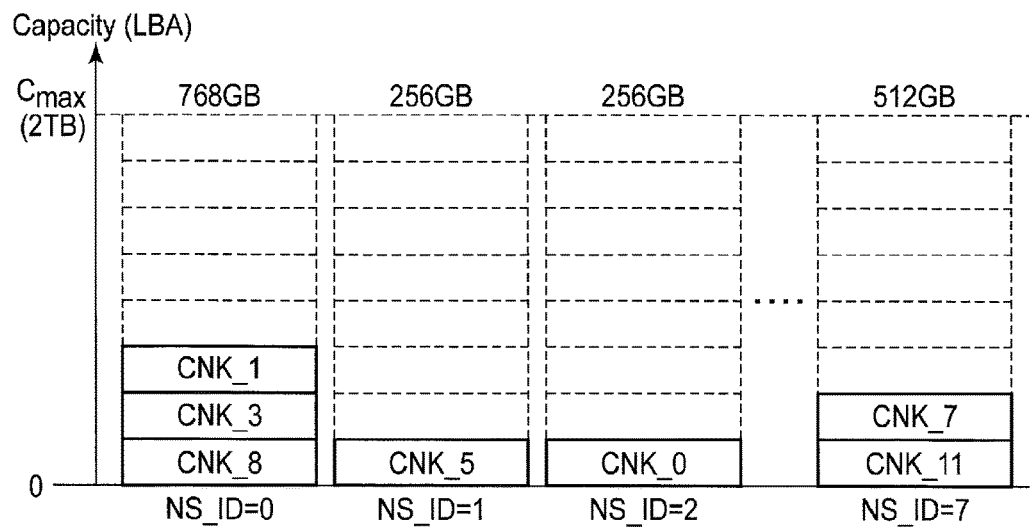
FIGS. 14 and 15 are diagrams for explaining LUT chunks.
Figure 15:
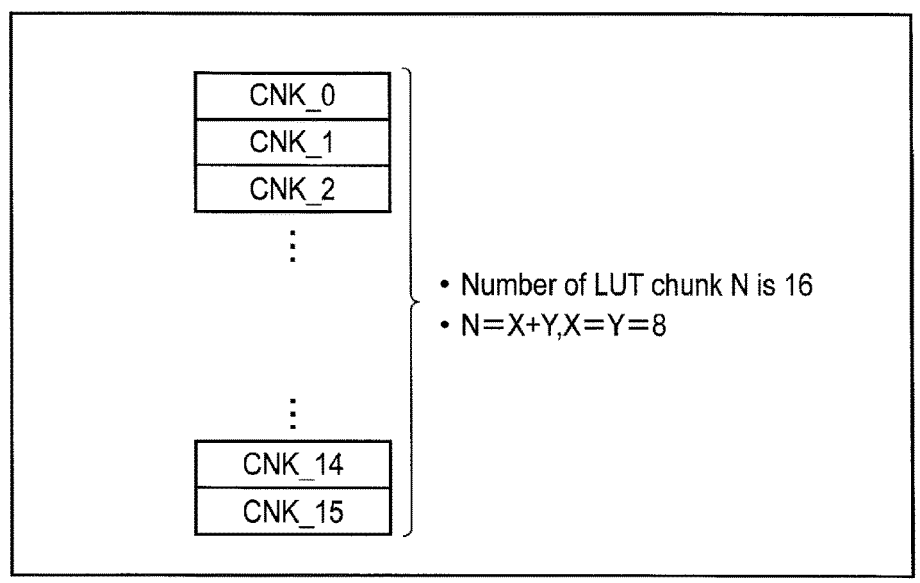

For example, as shown in FIGS. 14 and 15, a case where the maximum number X of the namespaces which the host can set is eight, and the number of divisions Y of the maximum capacity of one namespace is eight is assumed.

In this case, for example, eight namespaces (NS_ID=0, NS_ID=1, NS_ID=2, . . . , NS_ID=7) can be set. Also, the total number N of the LUT chunks is (X+Y)=16 (CNK_0, CNK_1, CNK_2, . . . , CNK_12, CNK_13, CNK_14, CNK_15). When it is assumed that the maximum capacity $C_{max}$ of one namespace is 2 terabytes, the capacity of one LUT chunk is 256 gigabytes.

The host can set the capacity of one namespace within the range from 0 bytes to 2 terabytes.

For example, when the capacity of the namespace (NS_ID=0) is set within the range from 513 gigabytes to 768 gigabytes, three LUT chunks CNK_1, CNK_3, and CNK_8 are associated with the namespace (NS_ID=0). Also, when the capacity of the namespace (NS_ID=1) is set within the range from 1 gigabyte to 256 gigabytes, one LUT chunk CNK_5 is associated with the namespace (NS_ID=1).

Similarly, when the capacity of the namespace (NS_ID=2) is set within the range from 1 gigabyte to 256 gigabytes, one LUT chunk CNK_0 is associated with the namespace (NS_ID=2). Also, when the capacity of the namespace (NS_ID=7) is set within the range from 257 gigabytes to 512 gigabytes, two LUT chunks CNK_7 and CNK_11 are associated with the namespace (NS_ID=7).

Further, the host specifies the position of data within the memory system 40 by using an identifier of the namespace (NS_ID), and logical address LBA.

For example, when the host requests the memory system 40 to read the user data, the host transfers the identifier of the namespace (NS_ID) and logical address LBA to the memory system 40. The device controller 42 translates logical address LBA into logical address LCA based on the identifier of the namespace (NS_ID) and logical address LBA.

In this case, as shown in FIGS. 16 and 17, when the namespace specified by the host is NSID=0, and logical address LBA is within the range of BAa to BAb, since LUT chunk CNK_8 is referred to, logical address LBA (BAa to BAb) is translated into logical address LCA (CAa to CAb).

Further, when the namespace specified by the host is NS_ID=0, and logical address LBA is within the range of BAc to BAd, since LUT chunk CNK_3 is referred to, logical address LBA (BAc to BAd) is translated into logical address LCA (CAc to CAd).

Furthermore, when the namespace specified by the host is NS_ID=0, and logical address LBA is within the range of BAe to BAf, since LUT chunk CNK_1 is referred to, logical address LBA (BAe to BAf) is translated into logical address LCA (CAe to CAf).

FIG. 18 shows an advantage of the second embodiment.

According to the second embodiment, for example, when logical address LBA (BAa to BAb) of namespace NS_ID=0 is to be accessed, by referring to LUT chunk CNK_8, translation from logical address LBA (BAa to BAb) into logical address LCA (CAa to CAb) is enabled. In contrast, in the comparative example, in namespace NS_ID=0, association between logical address LBA (BAa to BAb) and logical address LCA (CAa to CAb) must be performed for each address.

Similarly, for example, when logical address LBA (BAc to BAd) of namespace NS_ID=0 is to be accessed, by referring to LUT chunk CNK_3, translation from logical address LBA (BAc to BAd) into logical address LCA (CAc to CAd) is enabled. In contrast, in the comparative example, in namespace NS_ID=0, association between logical address LBA (BAc to BAd) and logical address LCA (CAc to CAd) must be performed for each address.

That is, the size of the LUT required in the second embodiment (i.e., the number of pointers for associating logical address LBA and logical address LCA with each other) can be made smaller than that required in the comparative example (i.e., the number of pointers for associating logical address LBA and logical address LCA with each other). Therefore, according to the second embodiment, processes such as addition and deletion of the namespace do not take time, and the load of the device controller 42 can be reduced.

CONCLUSION

As described above, according to the first embodiment, it is possible to improve the performance of the memory system by reducing the load of the CPU, and reduce power consumption by eliminating unnecessary operation of the CPU. Also, according to the second embodiment, by introducing the concept of LUT chunks, processes such as addition and deletion of the namespace do not take time, and the load of the CPU can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a first memory including a message queue having first to $n^{th}$ addresses (n is a natural number greater than or equal to 2), a first pointer showing one of the first to $n^{th}$ addresses, and a second pointer showing one of the first to $n^{th}$ addresses;
a monitor unit which detects whether the first and second pointers show the first address; and
a processing unit which changes an address shown by the first pointer from the first address to an $i^{th}$ address (i is a natural number greater than or equal to 2 and less than or equal to n) when the first and second pointers show the first address,
wherein an address shown by the second pointer is incremented from the first address to a $(j+1)^{th}$ address (j is a natural number greater than or equal to 1) when first to $j^{th}$ messages are queued in the first to $j^{th}$ addresses,
the monitor unit outputs information when (j+1) is equal to i, and
the processing unit processes the first to $j^{th}$ messages on the basis of the information.

2. The system of claim 1, wherein the processing unit changes the address shown by the first pointer from the first address to a (k+1) address when k messages (k is a natural number greater than or equal to 2) are to be processed in parallel.

3. The system of claim 1, wherein the first to $j^{th}$ messages are transferred from a message source, and the message source increments the address shown by the second pointer.

4. The system of claim 3, wherein the message source is a CPU or a hardware engine.

5. The system of claim 3, wherein the processing unit and the message source are CPUs, respectively.

6. The system of claim 1, wherein the processing unit changes the address shown by the first pointer from the $i^{th}$ address to an $I^{th}$ address (where I is a natural number greater than or equal to 2 and less than or equal to n) after receiving the information.

7. The system of claim 1, wherein the first memory includes an error queue showing whether the first to $j^{th}$ messages queued in the first to $j^{th}$ addresses include an error.

8. The system of claim 1, further comprising:
a second memory as a nonvolatile memory,
wherein the first to $j^{th}$ messages are responses of read commands to the second memory.

9. The system of claim 1, further comprising:
a second memory as a nonvolatile memory,
wherein the monitor unit and the processing unit are provided in a controller which controls the second memory.

10. The system of claim 9, wherein the first memory is provided in the controller.

11. A memory system which is connectable to a host, the system comprising:
a first memory storing user data and a table, the table being used for translating a first address into a second address when the host accesses the user data: and
a controller which translates the first address into the second address by referring to the table,
wherein the host manages a namespace which is storable in the table, the namespace includes chunks each having a given capacity of $A=C_{max}/Y$ and each corresponding to a plurality of second addresses, where $C_{max}$ is a maximum capacity of the namespace and $Y$ is a natural number greater than or equal to 2, and the first address is translated into one of the plurality of second addresses through one of the chunks.

12. The system of claim 11, wherein a number of the chunks in the namespace is determined on the basis of a capacity of the namespace provided by the host.

13. The system of claim 11, wherein a total number of the chunks is $N=(X+Y)$, where $X$ is a maximum number of namespaces which is managed by the host, and $X$ and $Y$ satisfy the relationship of $Y \geq X$.

14. The system of claim 13, wherein $Y$ is a maximum number of the chunks which is assignable in one namespace.

15. The system of claim 13, wherein $A \times N$ is greater than a capacity of the first memory.

16. The system of claim 11, wherein the first address is an address of a first data unit which is managed by the host, and the second address is an address of a read/write unit of the first memory.

17. The system of claim 11, wherein the first memory is a nonvolatile memory as a storage memory.

18. The system of claim 11, wherein the controller includes a second memory storing the table stored in the first memory as cache data.

19. The system of claim 11, further comprising a second memory storing the table stored in the first memory as cache data.

20. The system of claim 11, wherein the table shows association between the first address and the chunks and association between the chunks and the second address.

* * * * *